US012452287B2

United States Patent
Palanki et al.

(10) Patent No.: US 12,452,287 B2
(45) Date of Patent: Oct. 21, 2025

(54) BLOCKCHAIN ENABLED LARGE LANGUAGE MODEL RED TEAMING

(71) Applicant: American Express Travel Related Services Company, Inc., New York, NY (US)

(72) Inventors: Hiranmayi Palanki, Tampa, FL (US); Shankar Djeyassilane, Markham (CA)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 162 days.

(21) Appl. No.: 18/510,400

(22) Filed: Nov. 15, 2023

(65) Prior Publication Data

US 2025/0159014 A1 May 15, 2025

(51) Int. Cl.
*H04L 9/40* (2022.01)
*H04L 9/00* (2022.01)

(52) U.S. Cl.
CPC ............ *H04L 63/1433* (2013.01); *H04L 9/50* (2022.05)

(58) Field of Classification Search
CPC .............................. H04L 63/1433; H04L 9/50
USPC .......................................................... 726/25
See application file for complete search history.

(56) References Cited

U.S. PATENT DOCUMENTS

| 11,394,740 | B1* | 7/2022 | Shake | G06N 20/00 |
|---|---|---|---|---|
| 12,316,655 | B1* | 5/2025 | Thompson | H04L 63/1416 |
| 12,326,943 | B2* | 6/2025 | Salji | G06F 21/577 |
| 2020/0145446 | A1* | 5/2020 | Deardorff | H04L 63/20 |
| 2021/0021644 | A1* | 1/2021 | Crabtree | G06F 16/951 |
| 2021/0037055 | A1* | 2/2021 | Dumont | G06Q 30/0207 |
| 2021/0090449 | A1* | 3/2021 | Smith | G06N 20/00 |
| 2022/0116736 | A1* | 4/2022 | Williams | G16H 50/20 |
| 2024/0256678 | A1* | 8/2024 | Thompson | H04L 9/3213 |
| 2024/0289733 | A1* | 8/2024 | Singh | G06Q 10/08345 |
| 2025/0097237 | A1* | 3/2025 | Parla | H04L 63/1433 |
| 2025/0156303 | A1* | 5/2025 | Stevens | G06F 11/3612 |
| 2025/0168186 | A1* | 5/2025 | McDonald | H04L 63/1433 |

* cited by examiner

*Primary Examiner* — Dant B Shaifer Harriman
(74) *Attorney, Agent, or Firm* — Thomas Horstemeyer, LLP

(57) ABSTRACT

Disclosed are various approaches for blockchain-enabled large language model (LLM) red teaming. A large language model (LLM) red teaming management agent executed in a distributed ledger environment can deploy a plurality of subsidiary agents in the distributed ledger environment. An LLM red teaming agent deployed in the distributed ledger environment can cause a network service to perform an LLM red teaming action and return an LLM red teaming result. The LLM red teaming result can be evaluated to generate endorsement status information for the LLM.

20 Claims, 4 Drawing Sheets

BLOCKCHAIN ENABLED LARGE LANGUAGE MODEL RED TEAMING

BACKGROUND

Large language models (LLMs) are expanding the use of artificial intelligence (AI) exponentially. As this expansion continues, companies developing LLMs will contend with the challenges of ensuring the security of large amounts of data. The security of the data in the LLM itself is important, as are the responses that it creates for users. One of the significant concerns is the potential for misuse and errors introduced by the ubiquitous use of LLMs. These models can generate highly realistic and coherent text, making them a tool with the ability to provide great utility as well as great harm.

Their potential for misuse is concerning, enabling the creation of deceptive and inaccurate content. Biases can perpetuate unfair commentary that can contribute to societal problems. LLMs also raise privacy concerns as they could inadvertently generate text containing sensitive personal and enterprise information. As the use of LLMs proliferates, there is a need for enterprises to have a way to ensure that applications and programmatic usage of an LLM is safe, secure, and free from the various LLM specific issues. There is a further need to ensure that this safety has been tested at various points of development.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
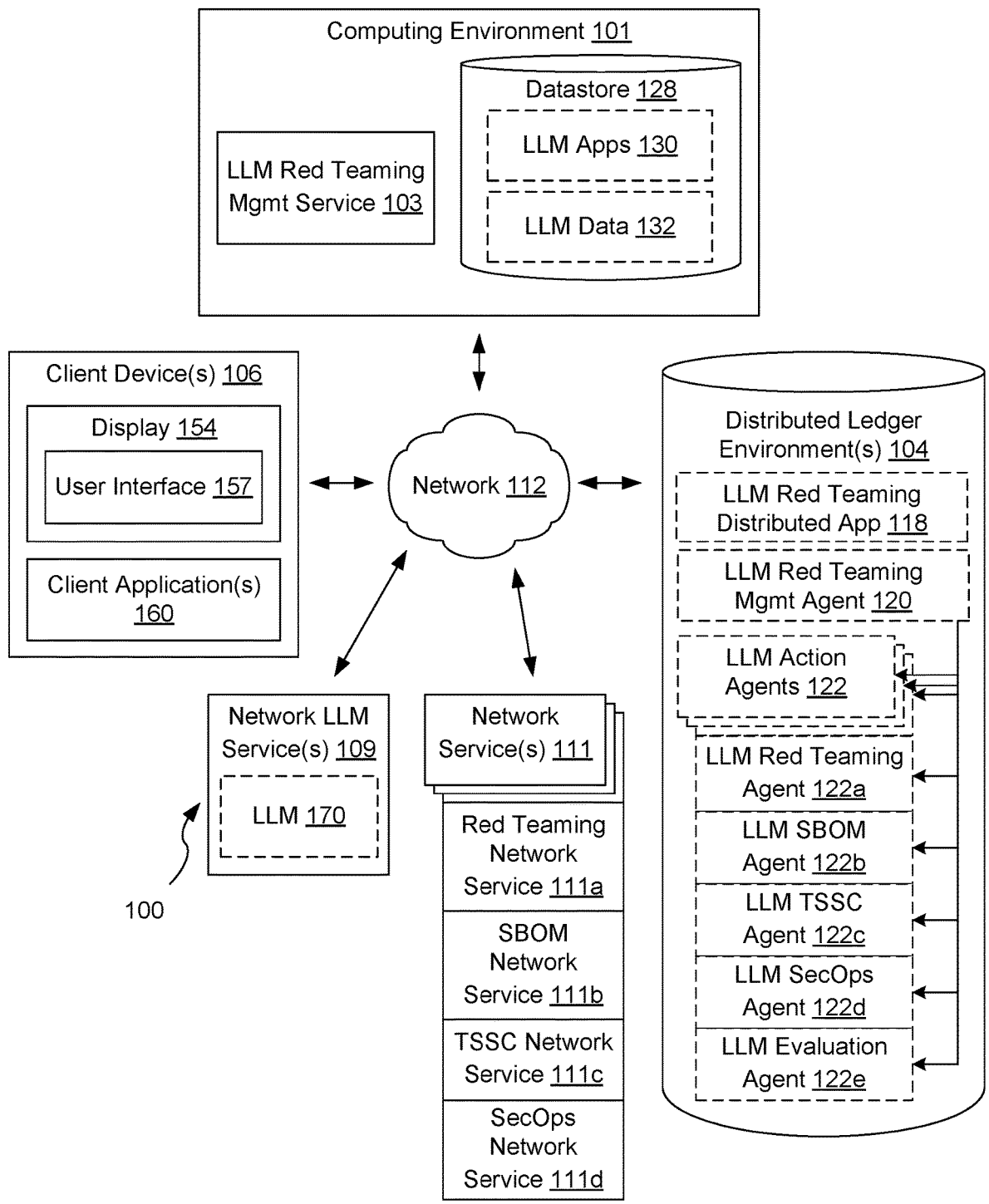
FIG. 1 is a drawing of a networked environment that includes components for blockchain enabled large language model (LLM) red teaming according to various embodiments of the present disclosure.

Disclosed are various approaches for blockchain enabled large-language model (LLM) red teaming. LLMs can generate highly realistic and coherent text, making them a tool with the ability to provide great utility as well as great harm. Accordingly, LLMs are expanding in use. As this expansion continues, enterprises developing LLMs and applications that interact with LLMs will contend with the challenges of ensuring the security of large amounts of data. The security of the data in the LLM itself is important, as are the responses that it creates for users. One of the significant concerns is the potential for misuse and errors introduced by the LLMs.

The potential for misuse of LLMs is concerning, enabling the creation of deceptive and inaccurate content. Biases can perpetuate unfair commentary that can contribute to societal problems. LLMs also raise privacy concerns as they could inadvertently generate text containing sensitive personal and enterprise information. As the use of LLMs proliferates, there is a need for enterprises to have a way to ensure that applications and programmatic usage of an LLM is safe, secure, according to specific types of tests performed at various points of development.

The mechanisms described in the present disclosure can provide a transparent, immutable, and efficient framework for coordinating and tracking LLM red teaming responsibilities, unlike existing technologies. These mechanisms can include one or more distributed ledger environments to securely handle and assign red teaming responsibilities. A distributed agent (e.g., a smart contract) on a distributed ledger (e.g., a blockchain) can coordinate communications with, and provide interfaces for, network services including LLM red teaming test services. The distributed agents or smart contracts can refer to bytecode deployed and executed in a distributed ledger environment. The components in the distributed ledger or ledgers can define and assign red teaming responsibilities, as well as track results and provide an overall evaluation of the LLM. In the various examples, the LLM service that develops, hosts, or otherwise provides the LLM can be notified of evaluation results and a description of potential corrections to perform on the LLM to ameliorate an identified issue.

In this context, as one skilled in the art will appreciate in light of this disclosure, embodiments can achieve certain improvements and advantages over traditional technologies, including some or all of the following: (1) improving the functioning of computer systems and networks, by increasing efficiency, and reducing power consumption and network bandwidth usage over other systems that merely use a set of networked computing devices for red teaming without utilizing the LLM red teaming distributed application, the LLM red teaming management agent, or any combination thereof; (2) improving the functioning of computer systems including the efficiency of using devices by using the interfaces provided using the LLM red teaming distributed application, the LLM red teaming management agent, or any combination thereof, preventing users of respective devices from having to open multiple applications, websites, and other interfaces to identify, coordinate, offer, accept, and make a record of red teaming responsibilities, and so forth.

In the following discussion, a general description of the components of risk mitigation systems and methods are provided, followed by a discussion of the operation of the same. Although the following discussion provides illustrative examples of the operation of various components of the present disclosure, the use of the following illustrative examples does not exclude other implementations that are consistent with the principals disclosed by the following illustrative examples.

With reference to FIG. 1, shown is a networked environment 100 according to various embodiments. The networked environment 100 can include a computing environment 101 for an LLM red teaming management service 103, distributed ledger environments 104, client devices 106, network LLM services 109, and other network services 111, all of which can be in data communication with each other via a network 112. Although depicted and described separately, any one or more of the network LLM services 109, network services 111, and the distributed ledger environments 104 can operate as a component executed using the computing environment 101 in various embodiments of the present disclosure.

The network 112 can include wide area networks (WANs), local area networks (LANs), personal area networks (PANs), or any combination thereof. These networks can include wired or wireless components or any combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 112 can also include a combination of two or more networks 112. Examples of networks 112 can include the Internet, intranets, extranets, virtual private networks (VPNs), and similar networks.

The computing environment 101 can include one or more computing devices that include a processor, a memory, and/or a network interface. For example, the computing devices can be configured to perform computations on behalf of other computing devices or applications. As another example, such computing devices can host and/or provide content to other computing devices in response to requests for content. The computing environment 101 can provide an execution environment for the LLM red teaming management service 103, and other executable instructions.

Moreover, the computing environment 101 can employ a plurality of computing devices that can be arranged in one or more server banks or computer banks or other arrangements. Such computing devices can be located in a single installation or can be distributed among many different geographical locations. For example, the computing environment 101 can include a plurality of computing devices that together can include a hosted computing resource, a grid computing resource or any other distributed computing arrangement. In some cases, the computing environment 101 can correspond to an elastic computing resource where the allotted capacity of processing, network, storage, or other computing-related resources can vary over time. Various applications or other functionality can be executed in the computing environment 101. The components executed on the computing environment 101 include an LLM red teaming management service 103 and other applications, services, processes, systems, engines, and functionality not discussed in detail herein.

The client device 106 is representative of a plurality of client devices 106 that can be coupled to the network 112. The client device 106 can include a processor-based system such as a computer system. Such a computer system can be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), media playback devices (e.g., media streaming devices, BluRay® players, digital video disc (DVD) players, set-top boxes, and similar devices), a videogame console, or other devices with like capability. The client device 106 can include one or more displays 154, such as liquid crystal displays (LCDs), gas plasma-based flat panel displays, organic light emitting diode (OLED) displays, electrophoretic ink ("E-ink") displays, projectors, or other types of display devices. In some instances, the displays 154 can be a component of the client device 106 or can be connected to the client device 106 through a wired or wireless connection.

The client device 106 can be configured to execute various applications such as a client application 160 or other applications. The client application 160 can be executed in a client device 106 to access network content served up by the computing environment 101 or other servers, thereby rendering a user interface 157 on the displays 154. To this end, the client application 160 can include a browser, a dedicated application, or other executable, and the user interface 157 can include a network page, an application screen, or other user mechanism for obtaining user input. The client device 106 can be configured to execute client applications 160 such as browser applications, chat applications, messaging applications, email applications, social networking applications, word processors, spreadsheets, or other applications.

The network LLM service 109 can refer to an online platform or service that provides access to LLMs 170 like OPENAI®'s GPT-3 (Generative Pre-trained Transformer version 3) LLM or other versions of the GPT LLM, the Large Language Model Meta AI (LLaMA), the Pathways Language Model (PaLM), or other generative artificial intelligence models. The LLM service 109 can include a chatbot service or another type of service that allows developers, researchers, and businesses to develop LLM applications 130 that integrate the textual language generation capabilities of LLMs 170. The network LLM services 109 can include pre-trained LLMs 170 that have been trained on a large amount of text data. The LLMs 170 can learn and identify patterns in grammar and semantics in order to generate coherent and contextually relevant text. Network LLM services 109 can use natural language processing to perform tasks such as text generation, summarization, translation, sentiment analysis, question answering, text completion and other language based processes. Network LLM services 109 can expose one or more APIs that enable LLM applications 130 to send text inputs and receive generated outputs from an LLM 170.

A distributed ledger environment 104 can refer to a decentralized network of computing devices or nodes that communicate using peer-to-peer network communications. The nodes of the distributed ledger environment 104 can provide and adhere to a consensus mechanism that validates and records transactions against a blockchain or another distributed ledger. The distributed ledger environment 104 can support distributed agents that are executed as distributed processes according to an agreed on and predetermined set of rules.

The LLM red teaming distributed application 118 can refer to an application that provides multiple parties with interfaces for performing and tracking LLM red teaming. In some embodiments, "LLM red teaming" can refer to testing that includes an adversarial approach to cybersecurity operations for LLMs 170, which can include simulating adversarial attacks and challenges that test the effectiveness of the LLM 170 and the network LLM service 109. This can also identify vulnerabilities, weaknesses, and errors that might not be identified if testing intended use cases and scenarios.

The interfaces provided using the LLM red teaming distributed application 118 can include programmatic interfaces and graphical user interfaces to design and implement LLM red teaming management agents 120. LLM red teaming distributed application 118 can refer to a decentralized application that operates using the distributed ledger environment 104, and without a single point of control. LLM red teaming distributed application 118 can use distributed ledger technology to generate, deploy, and execute the LLM red teaming management agent 120 and the LLM action agents 122 along with related distributed ledgers on which these distributed agents are stored. The LLM red teaming management agent 120 and the LLM action agents 122 can be distributed agents executed using the distributed ledger environment 104. The LLM red teaming management agent 120 can be considered a primary distributed agent that manages a red teaming analysis, while the LLM action agents 122 can refer to subsidiary distributed agents and contracts that request or command network services 111 to perform LLM actions including analyses, security actions, integration actions, deployment actions, and evaluation actions. Evaluation actions can include public endorsements of the LLM 170 according to the overall evaluation of analyses including LLM red teaming tests.

Deployment can refer to provisioning a computing environment and executing software for which the computing environment is provisioned. In the context of deploying LLM ted teaming distributed applications 118, LLM red teaming management agents 120, and LLM action agents 122, deployment can include provisioning the distributed ledger environments 104 and executing these components. Provisioning can refer to setting up and configuring hardware and software resources of the distributed ledger environments 104 for successful operation of the various components. Deployment can include all processes involved to successfully provision and execute these components. Deployment of other components can include provisioning another computing environment and storing data and/or executing instructions therein.

The LLM red teaming management agent 120 can include a distributed agent application executed in the distributed ledger environment 104. The LLM red teaming management agent 120 can be stored in a blockchain or distributed ledger. The LLM red teaming management agent 120 can refer to a self-executing programmable agent that enables parties to the contract to have a trustless, transparent, and immutable smart contract with known requirements, formatting, and interface definitions. The LLM red teaming management agent 120 can include actions that ensure that a set of LLM action agents 122, including the LLM red teaming agents 122a, perform LLM analysis actions including LLM red teaming tests for a specific LLM 170. The analysis actions can be considered part of a security analysis of an LLM 170. The LLM red teaming management agent 120 can electronically offer, receive confirmation of, and govern operation of actions that include a contract between any number of parties including entities associated with the LLM red teaming management service 103, the network LLM services 109, the network services 111, and others.

The LLM red teaming management agent 120 can specify which LLM analysis actions, including LLM red teaming tests, are to be performed. The LLM red teaming management agent 120 can also specify which network services 111 are to perform respective ones of the LLM analysis actions. For example, the LLM red teaming management agent 120 can specify a red teaming network service 111a to perform a red teaming analysis, a software bill of materials (SBOM) network service 111b to perform an SBOM analysis, a trusted software supply chain (TSSC) network service 111c to perform a trusted software supply chain analysis, and an overall evaluation process that evaluates the various results from the analysis actions. LLM analysis actions can include LLM red teaming actions 221, LLM SBOM actions 227, LLM TSSC actions 233, and other actions that perform analyses of an LLM 170. LLM analysis actions can generate various outputs discussed, which can be considered LLM analysis results. LLM analysis results can include LLM red teaming results that result from LLM red teaming actions 221, as well as LLM SBOM results from LLM SBOM actions 227, LLM TSSC results from LLM TSSC actions 233, and so on.

The LLM red teaming management agent 120 can further specify a security operations network service 111d to perform security operations against one or more enterprise environments to enable or disable use of LLMs 170, a continuous integration and continuous delivery service to perform integration and delivery of LLM applications 130 and updates to services to enable or disable use of LLMs 170. The actions performed by the security service and the continuous integration and continuous delivery service can be specified at contract institution, and a subset of the actions can be mapped to specified evaluation results from the evaluation service. The LLM red teaming management agent 120 can be considered an LLM evaluation management agent 120, since it can coordinate actions performed by many entities for many purposes in addition to red teaming.

The LLM action agents 122 can include agents that are subsidiary processes or subcontracts to the overall LLM red teaming management agent 120. The LLM action agents 122 can coordinate, request, and automatically perform red teaming, SBOM generation, TSSC identification, evaluation actions, and other analysis actions. The LLM action agents 122 can also coordinate, request, and automatically perform security actions, and continuous integration and continuous delivery actions, other actions that are mapped to the results generated from an overall evaluation of the analysis actions.

The LLM action agents 122 can transmit requests and commands for the specified network services 111 to perform specified actions in relation to a specified LLM 170. For example, a particular LLM action agent 122 can indicate that a particular network service 111 is to perform one or more specified LLM actions, whether the actions are analysis actions, security actions, deployment actions, integration actions, or endorsement actions.

For example, the LLM red teaming management agent 120 can deploy an LLM red teaming agent 122a that instructs a red teaming network service 111a to perform an LLM red teaming analysis. The LLM red teaming analysis can include an adversarial approach to cybersecurity operations for an LLM 170. The LLM red teaming management agent 120 can deploy an LLM SBOM agent 122b that instructs an SBOM network service 111b to generate an SBOM for an LLM 170. The LLM red teaming management agent 120 can deploy an LLM TSSC agent 122c that instructs a TSSC network service 111c to perform a TSSC analysis for an LLM 170. The TSSC analysis can include identifying whether the LLM 170 was developed using secure development practices, code review practices, testing practices, and so on. The TSSC analysis can also identify whether components of the LLM 170 are verified to ensure they come from trusted sources and haven't been tampered with. The LLM red teaming management agent 120 can deploy a security operations agent 122d that instructs a security operations network service 111d to perform LLM security operations that enable or disable access to an LLM 170 in a particular networked environment. The LLM red teaming management agent 120 can deploy an LLM evaluation agent 122e that evaluates the results from the various LLM analyses to generate evaluation data.

AN LLM action agent 122 can provide interfaces including programmatic and graphical interfaces that enable the particular network service 111 to provide results of the LLM actions. The results can include scores, SBOMs, trusted software supply chain information, other documents, evaluation information, completion indications, and action results. The LLM action agents 122 can also transmit information to the various network services 111 including LLM data that enables the network services 111 to perform specified evaluations and actions. The LLM action agents 122 can also directly perform a subset of the LLM actions.

The LLM action agents 122 can include LLM red teaming agents 122a. The LLM red teaming agents 122a can include action-performing or action-initiating agents that can be considered subsidiary processes to the overall LLM red teaming management agent 120. The LLM red teaming agents 122a can be referred to as LLM red teaming action agents, since they can request or command network services 111 to perform red teaming actions. For example, an LLM red teaming agent 122a can specify that a red teaming network service 111a is to perform one or more specified LLM red teaming tests. The LLM red teaming agent 122a can provide interfaces for the LLM red teaming network service 111a to provide results of the LLM red teaming tests, such as scores, documents, suggested corrective actions, example problematic interactions and LLM responses, and other evaluation information in specified formats. The LLM red teaming agent 122a can also transmit information to the particular red teaming network service 111a including LLM data 132 that enables the particular red teaming network service 111a to perform specified tests.

The LLM red teaming agents 122a can include red teaming contracts for red teaming and other testing of an LLM 170 specified in the LLM red teaming management agent 120. The LLM red teaming tests can include manual and automated tests that use a systematic and structured approach to evaluating the vulnerabilities, weaknesses, and risks of an LLM 170. This can include specially designed manual and automated adversarial attacks or interactions with an LLM 170. In some examples, the network service 111 downloads the specified LLM 170 and performs the tests in a sandboxed environment. In other examples, the network service 111 performs the tests by accessing the LLM 170 over the network 112. The LLM red teaming network service 111a can thereby identify vulnerabilities, weaknesses, and potential risks of the LLM 170. The network services 111 can include first parties and third parties relative to the LLM red teaming management service 103, and the network services 111 can be executed using the computing environment 101 or a different computing environment among the various examples.

A single network service 111 can perform multiple LLM red teaming tests for multiple types of risks, or different network service 111 can be used to perform different LLM red teaming tests. In some examples, any one or more of the LLM red teaming tests can be considered part of a security analysis of an LLM 170. The LLM red teaming tests performed by the network services 111 can include, but are not limited to harmful content mitigation tests, bias mitigation tests, sensitive data element (SDE) leakage prevention tests, LLM hallucination mitigation tests, LLM threat model tests, prompt injection security tests, and other LLM specific manual and automated tests. The tests can generate scores and corrective action suggestions according to a format specified in the LLM red teaming management agent 120. The various types of LLM red teaming tests can test message content and other information in packets communicated to and from the LLM 170 or the network LLM service 109. The various types of LLM red teaming tests can also analyze the code of the LLM 170 itself, as well as related interfacing and processing code that the network LLM service 109 uses to provide access to the LLM 170. In this context, references to the LLM 170 can be considered to include the related interfacing and processing code used to provide access to the LLM 170.

A harmful content filtering test can include manual and automated identification of offensive, inappropriate, or dangerous material. Harmful content can include explicit content, hate speech, cyberbullying, misinformation, scams, and so on. Harmful content filtering tests can ensure that an LLM 170 does not provide harmful content in response to red teaming testing inputs. Harmful content filtering tests can include testing the response from the LLM 170 or LLM service 109 for harmful content. Harmful content tests can provide predetermined or manual inputs designed to provoke harmful content responses, and check responses from an LLM 170 for harmful content.

A bias mitigation test can include manual and automated identification of biases in an LLM 170, including its communications in response to certain inputs. Bias mitigation can test for preconceived notions, prejudices, or unfair judgments that can have negative consequences for individuals or groups. The tested biases can include racial biases, sexual biases, gender biases, age biases, disability biases, religious biases, socioeconomic biases, beauty biases, and other biases. Bias mitigation tests can ensure that an LLM 170 does not provide biased content in response to red teaming testing inputs. Bias mitigation tests can include testing the response from the LLM 170 or LLM service 109 for biases. Bias mitigation tests can provide predetermined or manual inputs designed to provoke biased LLM outputs, and check responses from an LLM 170 for biases.

SDE leakage tests can include manual and automated identification of SDEs in an LLM 170, including its communications in response to certain inputs. The SDE leakage test can identify SDEs such as personal names, dates of birth, social security numbers, addresses, phone numbers, email addresses, financial information, health information, driver's license numbers, passport numbers, national identification numbers, biometric data, authentication information, employment information, criminal history, ethnicities, races, sexual orientations, gender identities, religious affiliations, political affiliations, child information, and so on. SDE leakage tests can ensure that an LLM 170 does not provide SDEs in response to red teaming testing inputs. SDE leakage tests can include testing the response from the LLM 170 or LLM service 109 for SDEs. SDE leakage tests can provide predetermined or manual inputs designed to provoke SDEs, and check responses from an LLM 170 for SDEs.

LLM hallucination tests can include manual and automated identification of LLM hallucinations in an LLM 170, including its communications in response to certain inputs. LLMs 170 can sometimes generate responses that seem plausible but are actually inaccurate, fictional, or unsupported by facts. These inaccurate LLM responses can be referred to as "hallucinations." An LLM hallucination test can check whether the outputs generated by the LLM 170 are factually accurate according to a predetermined and stored factual knowledge base. LLM hallucination tests can ensure that an LLM 170 does not provide inaccurate information in response to red teaming testing inputs. LLM hallucination tests can provide predetermined or manual inputs designed to provoke LLM hallucinations, and check responses from an LLM 170 for accuracy.

The LLM threat model tests can include an automated evaluation that analyzes the LLM 170 and its communications from the perspective of an attacker. This can identify and quantify security risks associated with LLM outputs generated by the LLM 170. In some examples, LLM threat model tests can include a manual or automated that decomposes the LLM 170, determines and ranks an identified set of threats, and determining countermeasures and mitigations.

The prompt injection prevention tests can include an automated or manual evaluation that analyzes the LLM 170 and its communications to identify whether malicious prompt injections can be introduced by attackers in an attack on the LLM 170.

Various data is stored in a datastore 128 that is accessible to the computing environment 101. The datastore 128 can be representative of a plurality of datastores 128, which can include relational databases or non-relational databases such as object-oriented databases, hierarchical databases, hash tables or similar key-value datastores, as well as other data storage applications or data structures. Moreover, combinations of these databases, data storage applications, and/or data structures can be used together to provide a single, logical, datastore. The data stored in the datastore 128 is associated with the operation of the various applications or functional entities described below. The data is stored in a datastore 128 can include LLM applications 130 and LLM data 132, among other items.

The LLM red teaming management service 103 can include a service that includes programs and instructions that analyzes LLM applications 130 and facilitates risk mitigation in their communications with network LLM services 109. To this end, the LLM red teaming management service 103 can analyze source code and bytecode of various applications to identify whether the applications interact with network LLM services 109. This static analysis can be performed according to a portion of the LLM flow identification rules 142.

The LLM red teaming management service 103 can thereby identify an LLM flow that is a subset of an overall flow of the LLM application 130. The LLM red teaming management service 103 can include or use a plugin for a static code analysis program to identify that an application is an LLM application 130, and to identify the LLM flow portion of the LLM application 130. The LLM flow can include an LLM source method and an LLM sink method, as well as other intermediate methods or actions.

The LLM application 130 can refer to an application that interacts with one or more LLM 170. The LLM application 130 can include code that references a network address or endpoint of the network LLM service 109 or the LLM 170, or otherwise identifies an LLM 170. In some examples, the LLM red teaming management service 103 can analyze an LLM application 130 and identify a new LLM 170 for which the LLM data 132 is not yet stored. The LLM red teaming management service 103 can generate a unique identifier for the LLM 170, identify or generate a unique identifier for its network LLM service 109, and retrieve and store LLM data 132 from the network LLM service 109.

The LLM data 132 can include data about network LLM services 109, LLMs 170, network services 111, and LLM applications 130. Each LLM 170 can be stored in a data structure in association with a unique identifier of the LLM 170, a unique identifier of the network LLM service 109 that provides it, a subject or category that LLM 170 corresponds to, and a set of tests and operations to perform in order to evaluate the LLM 170 or its category of LLM. The LLM data 132 can also include a stored copy or instance of the LLMs 170 retrieved from a network LLM service 109, and a network address or endpoint to retrieve LLMs 170 from the network services 109 or the computing environment 101.

The LLM data 132 can also include information about the network services 111 that perform each of the tests and operations for an evaluation of the LLM 170. This can include a network endpoint exposed for a programmatic interface such as an application programming interface (API) that a component of the networked environment 100 can invoke to request a manual or automated functionality that is performed by the network service 111. The LLM red teaming management service 103 can invoke the programmatic interface using parameters that include any of the LLM data 132 such as the LLM 170, an identifier of the LLM 170, or a network endpoint to download or access the LLM 170. In some examples, authentication information to access or download the LLM 170 can be provided as well.

The LLM data 132 can also include communications information including network address endpoints and authentication information that enables access to an LLM red teaming distributed application 118. The LLM data 132 can also include information for how to create an LLM red teaming management agent 120 for the LLM 170 using the LLM red teaming distributed application 118. The LLM data 132 can indicate whether red teaming and other tests have been performed for the LLM 170.

The following sequence diagrams and flowcharts provide a general description of the operation of the various components of the networked environment 100. Although the general descriptions can provide provides an example of the interactions between the various components of the networked environment 100, other interactions between the various components of the networked environment 100 are also possible according to various embodiments of the present disclosure. Interactions described with respect to a particular figure or sequence diagram can also be performed in relation to the other figures and sequence diagrams herein.

Figure 2:
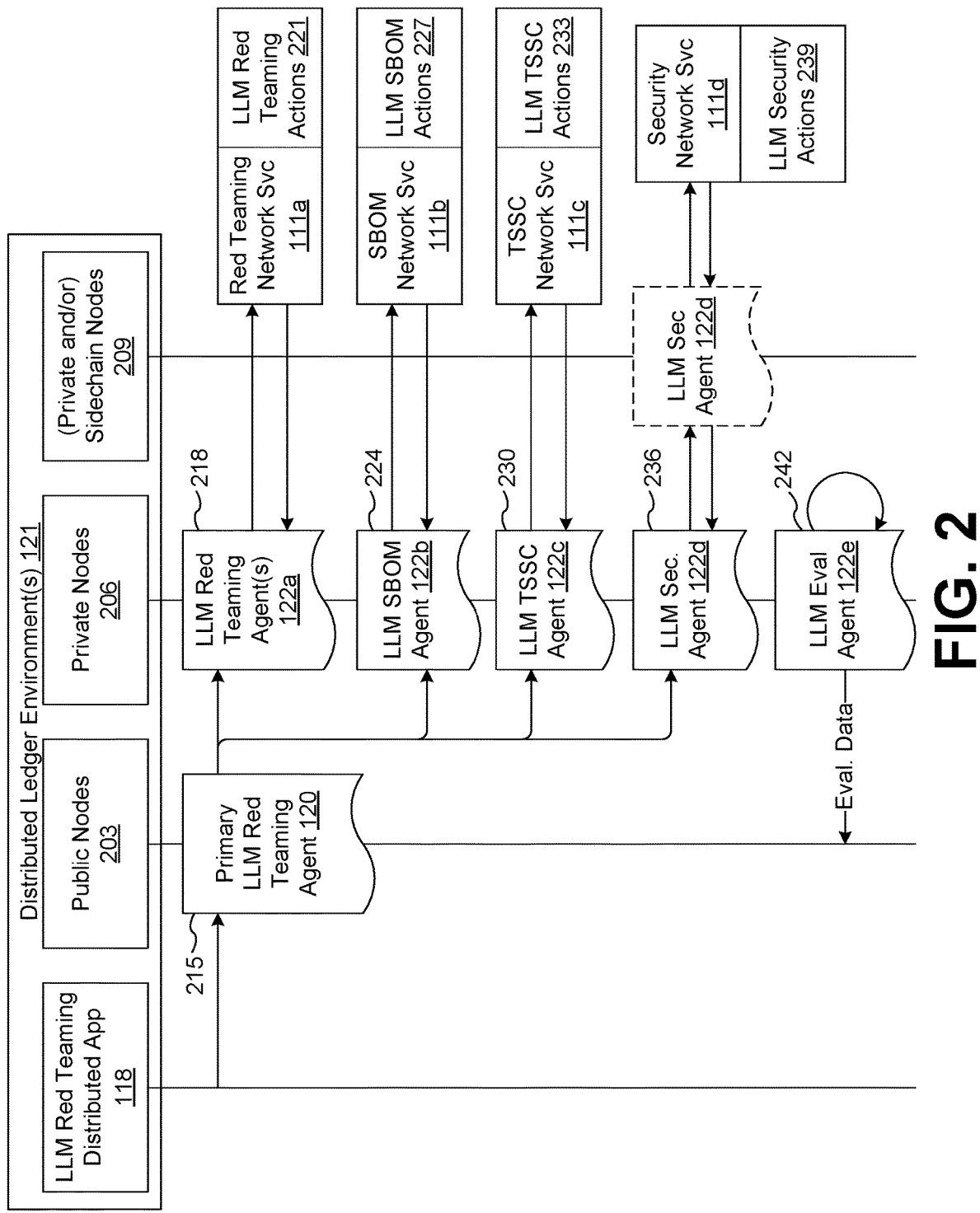
FIG. 2 is a sequence diagram illustrating an example of blockchain enabled LLM red teaming using the components of the networked environment of FIG. 1 according to various embodiments of the present disclosure.

FIG. 2 shows a sequence diagram providing an example of blockchain enabled LLM red teaming implemented using components of the networked environment 100. The sequence diagram of FIG. 2 provides merely an example of the many different types of functional arrangements that can be employed to implement the depicted interactions between the components of the networked environment 100. As an alternative, the sequence diagram of FIG. 2 can be viewed as depicting an example of elements of a method implemented within the networked environment 100. While actions are generally described as performed using a particular component, the actions can additionally or alternatively be implemented at least in part using other components of the networked environment 100.

In this sequence diagram, the distributed ledger environment 121 can include the LLM red teaming distributed application 118, public nodes 203, private nodes 206, and sidechain nodes 209. In some examples, the distributed ledger environment 121 can include a hybrid ledger environment with one or more blockchains storing the various transactions. Whether there is a single blockchain or multiple blockchains, items stored in the public nodes 203 can enable permissionless or general access to items stored in the public nodes, while items stored in the private nodes 206 can be permissioned and limited to a predetermined set of selected, verified, and authenticated entities. The public nodes 203 can be physically separate nodes from the private nodes 206, while both sets of nodes can be part of a single distributed ledger environment 104. In some examples, the items stored in the public nodes 203 and the private nodes 206 can provide access to items stored in a single distributed ledger or blockchain. Alternatively, the same nodes can be utilized, and public and private access can be enabled and disabled using permissioning and without using physically separate nodes to host the various components. The endpoints used to access the various contracts can be the same or different in various embodiments. Among the various embodiments, the same distributed ledger is used for all contracts, and in other examples, multiple distributed ledgers are used for the various contracts.

Sidechain nodes 209 can provide a separate blockchain connected to a primary blockchain through a two-way bridge or another communication channel. In some examples, the public nodes 203, the private nodes 206 or any combination thereof, can provide a primary blockchain to which the separate blockchain has a communication channel. Any one or more of the items referred to as being included in the private nodes 206 can additionally or alternatively be included in a sidechain node 209. For example, each LLM red teaming agent 122a can be deployed and executed using sidechain nodes 209 rather than private nodes 206. Any one or more of the LLM SBOM agent 122b, LLM TSSC agent 122c, LLM security agent 122d, LLM evaluation agent 122e, can additionally or alternatively be provided using sidechain nodes 209 of the distributed ledger environment 104.

In block 215, the LLM red teaming distributed application 118 can generate and store the LLM red teaming management agent 120 so that it is accessible publicly using the public nodes 203. The LLM red teaming distributed application 118 can include programmatic interfaces and graphical user interfaces to design and generate the LLM red teaming management agent 120 for a particular LLM 170. LLM red teaming distributed application 118 can use the distributed ledger environment 104 to generate, store, and execute the LLM red teaming management agent 120 and the LLM action agents 122. The LLM red teaming distributed application 118 can transmit a transaction to a blockchain or other distributed ledger that causes the LLM red teaming management agent 120 to be stored so that it is publicly or generally available. In some examples, this public or general availability can provide or limit access to a set of all registered users that are registered with and include identities with the distributed ledger environment 121.

In a user-initiated example, a user of a client device 106 can access the LLM red teaming distributed application 118 and input the LLM 170 itself or a network address to download or access the LLM 170. The LLM red teaming distributed application 118 can then automatically identify LLM data 132 that specifies a set of tests and actions to perform, and a set of network services 111 that perform the tests and other actions. The LLM red teaming distributed application 118 can automatically generate the LLM red teaming management agent 120 and can provide user interfaces that enable the user to add, remove, and otherwise modify the tests and actions as well as the network services 111 specified to perform each action. In automated examples, the LLM red teaming management service 103 can identify that an LLM application 130 accesses a "new" LLM 170 that has not been tested and evaluated by red teaming. The LLM red teaming management service 103 can transmit instructions for the LLM red teaming distributed application 118 to generate the LLM red teaming management agent 120. In either case, the LLM red teaming distributed application 118 can transmit notifications or other communications requesting that the network service 111, as well as other enterprises to confirm, accept, or access the LLM red teaming management agent 120 once generated.

In block 218, the LLM red teaming management agent 120 can generate and store an LLM red teaming agent 122a so that it is available privately using the private nodes 206. This can include transmitting a transaction that includes the LLM red teaming agent 122a and instructions to deploy and execute it using the private nodes 206. The transaction can be stored using the same distributed ledger or a different distributed ledger relative to the LLM red teaming management agent 120. Multiple LLM red teaming agents 122a can be generated for multiple different red teaming network services 111a. Each of the red teaming network services 111a can perform a particular set of LLM red teaming actions 221. In some examples, the LLM red teaming management agent 120 can generate the LLM red teaming agents 122a using LLM data 132 that is contained in the LLM red teaming management agent 120. The LLM red teaming management agent 120 can additionally or alternatively retrieve LLM data 132 from the LLM red teaming management service 103. An LLM red teaming agent 122a can include programmatic interfaces and graphical user interfaces that prompt or request a network service to perform a particular set of LLM red teaming actions 221 for a particular LLM 170, as well as programmatic interfaces and graphical user interfaces that receive results of the LLM red teaming actions 221.

Separating the LLM red teaming management agent 120 from the LLM red teaming agents 122a, for example, by limiting access to the LLM red teaming agents 122a using the private nodes 206 rather than the public nodes 203 can reduce the amount of publicly available information resulting from red teaming the LLM 170. Limiting access to the LLM red teaming agents 122a can reduce chances that nefarious actors misuse an LLM 170 based at least in part on vulnerabilities that are identified though the LLM red teaming actions 221. This can also reduce availability of proprietary results and test scores for test types generated by the LLM red teaming network services 111a and returned to the LLM red teaming agents 122a. In some examples, access to a particular LLM red teaming agent 122a can be limited to one or more trusted parties including an entity providing the LLM red teaming management service 103 and an entity providing a particular network service 111 that is performing the LLM red teaming actions 221 specified in that LLM red teaming agent 122a. The specified LLM red teaming actions 221 can include one or more types of LLM red teaming tests.

In block 224, the LLM red teaming management agent 120 can generate and store an LLM SBOM agent 122b so that it is available privately using the private nodes 206. This can include transmitting a transaction that includes the LLM SBOM agent 122b and instructions to deploy and execute it using the private nodes 206. The transaction can be stored using the same distributed ledger or a different distributed ledger relative to the LLM red teaming management agent 120.

An SBOM networking service 111b can perform a particular set of LLM SBOM actions 227 specified in the LLM SBOM agent 122b. In some examples, the LLM red teaming management agent 120 can generate the LLM SBOM agent 122b using LLM data 132 that is contained in the LLM red teaming management agent 120. The LLM red teaming management agent 120 can additionally or alternatively retrieve LLM data 132 from the LLM red teaming management service 103. An LLM SBOM agent 122a can include programmatic interfaces and graphical user interfaces that prompt or request an LLM SBOM network service 111b to perform a particular set of LLM SBOM actions 227 for a particular LLM 170, as well as programmatic interfaces and graphical user interfaces that receive results of the LLM SBOM actions 227.

Separating the LLM red teaming management agent 120 from the LLM SBOM agent 122b can reduce the amount of publicly available information resulting from analysis of the LLM 170. Limiting access to the LLM SBOM agent 122b can reduce chances that nefarious actors misuse an LLM 170 based at least in part on information identified though the LLM SBOM actions 227. This can also reduce availability of proprietary results of the LLM SBOM actions 227. In some examples, access to an LLM SBOM agent 122b can be limited to one or more trusted parties including an entity providing the LLM red teaming management service 103 and an entity providing a particular LLM SBOM network service 111b that is performing the LLM SBOM actions 227.

In block 230, the LLM red teaming management agent 120 can generate and store an LLM TSSC agent 122c so that it is available privately using the private nodes 206. This can include transmitting a transaction that includes the LLM TSSC agent 122c and instructions to deploy and execute it using the private nodes 206. The transaction can be stored using the same distributed ledger or a different distributed ledger such as a side ledger or another separate ledger relative to the LLM red teaming management agent 120.

A TSSC networking service 111c can perform a particular set of LLM TSSC actions 233 specified in the LLM TSSC agent 122c. In some examples, the LLM red teaming management agent 120 can generate the LLM TSSC agent 122c using LLM data 132 that is contained in the LLM red teaming management agent 120. The LLM red teaming management agent 120 can additionally or alternatively retrieve LLM data 132 from the LLM red teaming management service 103. The LLM TSSC agent 122c can include programmatic interfaces and graphical user interfaces that prompt or request a network service to perform a particular set of LLM TSSC actions 233 for a particular LLM 170, as well as programmatic interfaces and graphical user interfaces that receive results of the LLM TSSC actions 233.

Separating the LLM red teaming management agent 120 from the LLM TSSC agent 122c can reduce the amount of publicly available information resulting from analysis of the LLM 170. Limiting access to the LLM TSSC agent 122c can reduce chances that nefarious actors misuse an LLM 170 based at least in part on information identified though the LLM TSSC actions 233. This can also reduce availability of proprietary results of the LLM TSSC actions 233. In some examples, access to an LLM TSSC agent 122c can be limited to one or more trusted parties including an entity providing the LLM red teaming management service 103 and an entity providing a particular network service 111 that is performing the LLM TSSC actions 233.

In block 236, the LLM red teaming management agent 120 can generate and store the LLM security agent 122d so that it is available privately using the private nodes 206. This can include transmitting a transaction that includes the LLM security agent 122d and instructions to deploy and execute it using the private nodes 206. Additionally or alternatively, an LLM security agent 122d can be generated and stored using a sidechain hosted using sidechain nodes 209. The sidechain nodes 209 can provide a sidechain or distributed ledger that runs in parallel to a primary or parent blockchain of the primary LLM red teaming agent 120 (and in some examples the LLM action agents 122). The sidechain nodes 209 can enable assets and data to be transferred in an efficient and scalable manner. The LLM action agents 122 shown for the private nodes 206 can be a permissioned portion of a primary blockchain of the LLM red teaming management agent 120, but can additionally or alternatively be part of a sidechain relative to the primary distributed ledger. This can include transmitting a transaction that includes the LLM security agent 122d. The transaction can be stored using the same distributed ledger or a different distributed ledger relative to the LLM red teaming management agent 120.

A security operations network service 111d, an enterprise environment, or a cloud computing environment can perform a particular set of LLM security actions 239 specified in the LLM security agent 122d. In some examples, the LLM red teaming management agent 120 can generate the LLM security agent 122d using LLM data 132 that is contained in the LLM red teaming management agent 120. The LLM red teaming management agent 120 can additionally or alternatively retrieve LLM data 132 from the LLM red teaming management service 103. The LLM security agent 122d can include programmatic interfaces and graphical user interfaces that prompt or request a network service to perform a particular set of LLM security actions 239 for a particular LLM 170, as well as programmatic interfaces and graphical user interfaces that receive results of the LLM security actions 239.

The LLM security actions 239 can include transmitting update instructions to a firewall system, an Intrusion Detection System (IDS), an Intrusion Prevention System (IPS), a Security Information and Event Management (SIEM) system, a threat intelligence system, and a threat hunting system, and other components of an enterprise or cloud computing environment. This can include preventing or enabling communications with a particular LLM 170, such as blocking or opening inbound and outbound connections based at least in part on a pattern or signature the LLM 170.

The signature of the LLM 170 can include a signature hash or cryptographic hash value generated for communications with the LLM 170. The cryptographic hash value can provide a compact and unique representation of the signature. The signature can refer to a set of information identified from packets of inbound or outbound communications. If the hash of incoming traffic matches a known signature hash, it indicates a potential threat, and the firewall or IPS can take action by blocking the traffic or generating an alert. LLM security agent 122d can generate the LLM signature based at least in part on the code of the LLM 170 and communication information for the LLM 170 and the LLM network service 109. Separating the LLM red teaming management agent 120 from the LLM security agent 122d can reduce the amount of publicly available about security postures and configurations of environments configured using the LLM security actions 239.

In block 242, an LLM evaluation agent 122e can generate an evaluation based at least in part on results from the LLM red teaming actions 221. The LLM red teaming management agent 120 can generate and deploy the LLM evaluation agent 122e so that it is available privately using the private nodes 206. This can include transmitting a transaction that includes the LLM evaluation agent 122e and instructions to deploy and execute it using the private nodes 206. The LLM evaluation agent 122e can have access to a public ledger, private ledger, or side ledger generated using the LLM action agents 122, including the LLM red teaming agents 122a. These LLM action agents 122 can store results from the LLM red teaming actions 221 in the public, private, or side ledger so that they are accessible to the LLM evaluation agent 122e.

The LLM evaluation agent 122e can include a set of predetermined LLM evaluation rules that it uses to process and weight scores for the various red teaming tests to generate an overall score. The overall score can be compared to a threshold overall score to identify an endorsement status such as a binary decision to support or deny endorsement of the LLM 170. The endorsement status can also include an overall numerical endorsement, an overall symbol-based endorsement, an overall color-coded endorsement, an overall textual description-based endorsement, or any combination thereof. The endorsement status can be part of endorsement status information including the endorsement status, as well as category-specific numerical endorsements, symbol-based endorsements, textual description-based endorsement, or any combination thereof. The category-specific scores can correspond to the various types of LLM red teaming actions 221, as well as the LLM SBOM actions 227, LLM TSSC actions 233, and LLM security actions 239. The LLM evaluation agent 122e can transmit this endorsement status information to the LLM red teaming management agent 120 or another publicly available ledger. The endorsement status information can also be posted or transmitted to a website or another publicly available network location. In other words, the LLM evaluation agent 122e can transmit a transaction that includes the endorsement status information for public storage and access using the public nodes 203.

Figure 3:
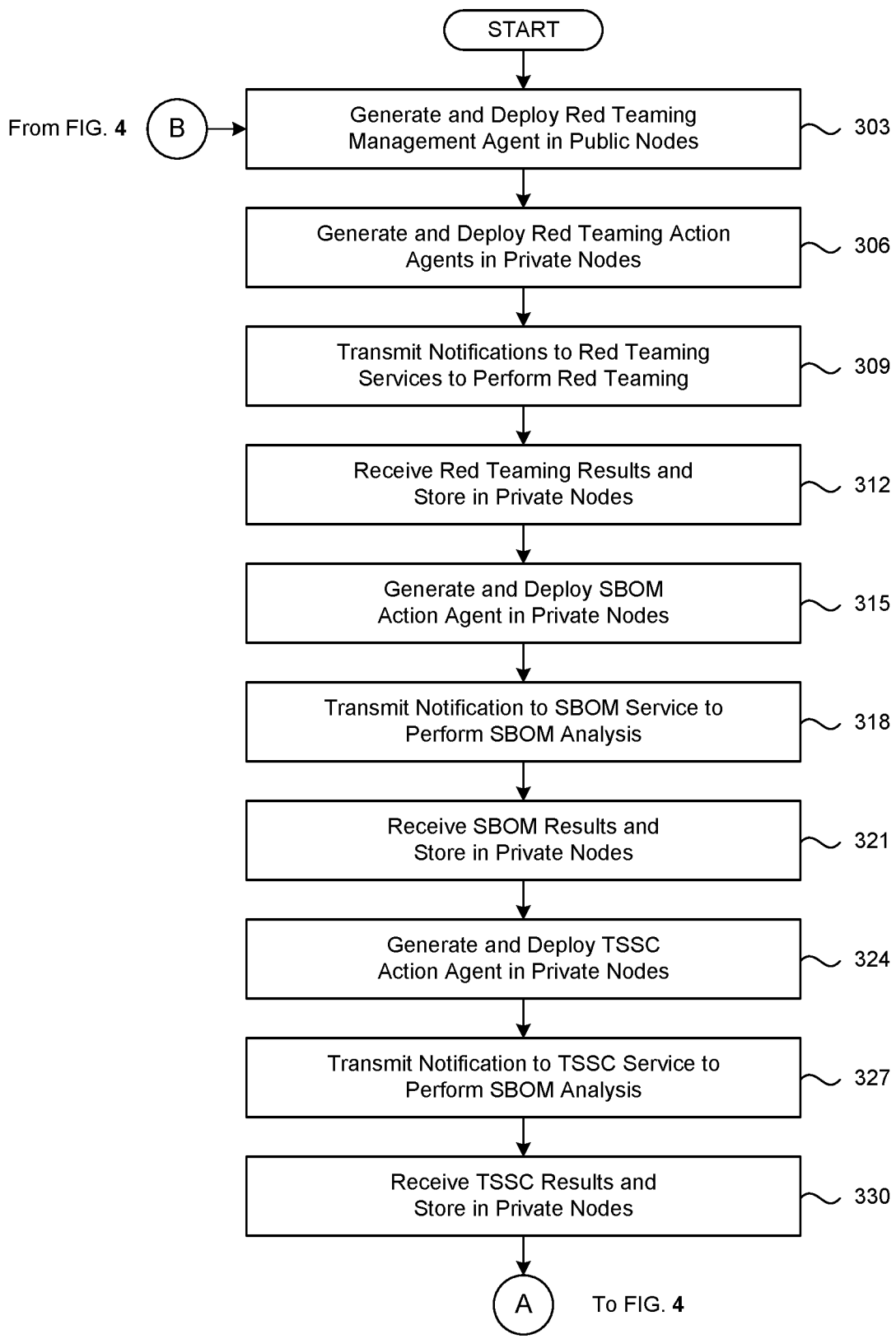
FIG. 3 is a flowchart illustrating functionality performed by components of the networked environment of FIG. 1 for blockchain enabled LLM red teaming according to various embodiments of the present disclosure.

FIG. 3 shows a flowchart that provides an example of blockchain enabled LLM red teaming implemented using components of the networked environment 100. The flowchart of FIG. 3 provides merely an example of the many different types of functional arrangements that can be employed to implement the depicted interactions between the components of the networked environment 100. As an alternative, the flowchart of FIG. 3 can be viewed as depicting an example of elements of a method implemented within the networked environment 100. While actions are generally described as performed using a particular component, the actions can additionally or alternatively be implemented at least in part using other components of the networked environment 100.

In block 303, the LLM red teaming distributed application 118 can generate and deploy the LLM red teaming management agent 120 for public access in the public nodes 203. The LLM red teaming distributed application 118 can include programmatic interfaces and graphical user interfaces to design and generate the LLM red teaming management agent 120 for a particular LLM 170. LLM red teaming distributed application 118 can use the distributed ledger environment 104 to generate, store, and execute the LLM red teaming management agent 120. The LLM red teaming distributed application 118 can transmit a transaction to a blockchain or other distributed ledger that causes the LLM red teaming management agent 120 to be stored so that it is publicly or generally available. The generation and deployment of the LLM red teaming management agent 120 can be user-initiated or automatically initiated in response to identification of an untested LLM 170.

In block 306, the LLM red teaming management agent 120 can generate and deploy an LLM red teaming agent 122a so that it is available privately using the private nodes 206. This can include transmitting a transaction that includes the LLM red teaming agent 122a and instructions to deploy and execute it using the private nodes 206. The transaction can be stored using the same distributed ledger or a different distributed ledger relative to the LLM red teaming management agent 120. Multiple LLM red teaming agents 122a can be generated for multiple different network services 111. Each of the network services 111 can perform a specified set of LLM red teaming actions 221. An LLM red teaming agent 122a can generate programmatic interfaces and graphical user interfaces that prompt or request a network service to perform a particular set of LLM red teaming actions 221 for a particular LLM 170, as well as programmatic interfaces and graphical user interfaces that receive results of the LLM red teaming actions 221.

In block 309, the LLM red teaming management agent 120 can transmit a notification to a network service 111 that performs LLM red teaming. The notification can operate as a request, and can indicate that an LLM red teaming agent 122a is deployed and ready for confirmation and interaction. Alternatively, the LLM red teaming agent 122a can provide the notification. The LLM red teaming network service 111a can transmit, and the LLM red teaming agent 122a can receive, confirmation that the LLM red teaming network service 111a is to perform the set of LLM red teaming actions 221 such as tests and analyses specified in the LLM red teaming agent 122a.

In block 312, the LLM red teaming agent 122a can receive results of the LLM red teaming actions or tests specified in the LLM red teaming agent 122a. The LLM red teaming agent 122a can receive the results through the programmatic interfaces and graphical user interfaces it exposes for the LLM red teaming network service 111a. The LLM red teaming agent 122a can store the results for private access in the private nodes 206. This can include permitting access by LLM action agents 122 including the LLM evaluation agent 122e, continuous integration and continuous deployment LLM action agents 122, as well as LLM security agents 122c and 122d.

In block 315, the LLM red teaming management agent 120 can generate and deploy an LLM SBOM agent 122a so that it is available privately using the private nodes 206. This can include transmitting a transaction that includes the LLM SBOM agent 122a and instructions to deploy and execute it using the private nodes 206. The transaction can be stored using the same distributed ledger or a different distributed ledger relative to the LLM red teaming management agent 120. An LLM SBOM agent 122a can generate programmatic interfaces and graphical user interfaces that prompt or request a network service to perform a particular set of LLM SBOM actions 227 for a particular LLM 170, as well as programmatic interfaces and graphical user interfaces that receive results of the LLM SBOM actions 227.

In block 318, the LLM red teaming management agent 120 can transmit a notification to an LLM SBOM specific network service 111, indicating that an LLM SBOM agent 122a is deployed and ready for confirmation and interaction. Alternatively, the LLM SBOM agent 122a can provide the notification. The LLM red teaming network service 111a can transmit, and the LLM SBOM agent 122a can receive, confirmation that the LLM red teaming network service 111a is to perform the set of LLM SBOM actions 227 such as SBOM tests and analyses specified in the LLM SBOM agent 122a.

In block 321, the LLM red teaming agent 122a can receive results of the LLM SBOM actions 227 specified in the LLM SBOM agent 122a. The LLM SBOM agent 122a can receive the results through the programmatic interfaces and graphical user interfaces it exposes for the LLM SBOM network service 111b. The LLM SBOM agent 122a can store the results for private access in the private nodes 206. This can include permitting access by LLM action agents 122 including the LLM evaluation agent 122e, continuous integration and continuous deployment LLM action agents 122, as well as LLM security agents 122c and 122d.

In block 324, the LLM red teaming management agent 120 can generate and deploy an LLM TSSC agent 122b so that it is available privately using the private nodes 206. This can include transmitting a transaction that includes the LLM TSSC agent 122b and instructions to deploy and execute it using the private nodes 206. The transaction can be stored using the same distributed ledger or a different distributed ledger relative to the LLM red teaming management agent 120. An LLM TSSC agent 122b can generate programmatic interfaces and graphical user interfaces that prompt or request a network service to perform a particular set of LLM TSSC actions 233 for a particular LLM 170, as well as programmatic interfaces and graphical user interfaces that receive results of the LLM TSSC actions 233.

In block 327, the LLM red teaming management agent 120 can transmit a notification to an LLM TSSC specific network service 111, indicating that an LLM TSSC agent 122b is deployed and ready for confirmation and interaction. Alternatively, the LLM TSSC agent 122b can provide the notification. The LLM red teaming network service 111a can transmit, and the LLM TSSC agent 122b can receive, confirmation that the LLM red teaming network service 111a is to perform the set of LLM TSSC actions 233 such as TSSC tests and analyses specified in the LLM TSSC agent 122b.

In block 330, the LLM red teaming agent 122a can receive results of the LLM TSSC actions 233 specified in the LLM TSSC agent 122b. The LLM TSSC agent 122b can receive the results through the programmatic interfaces and graphical user interfaces it exposes for the LLM TSSC network service 111. The LLM TSSC agent 122b can store the results for private access in the private nodes 206. This can include permitting access by LLM action agents 122 including the LLM evaluation agent 122e, continuous integration and continuous deployment LLM action agents 122, as well as LLM security agents 122c and 122d. The LLM TSSC actions 233, as well as the LLM SBOM actions 227, and the LLM red teaming actions 221, can be considered LLM 170 analysis actions that process the code of the LLM 170 and LLM responses of the LLM 170.

Figure 4:
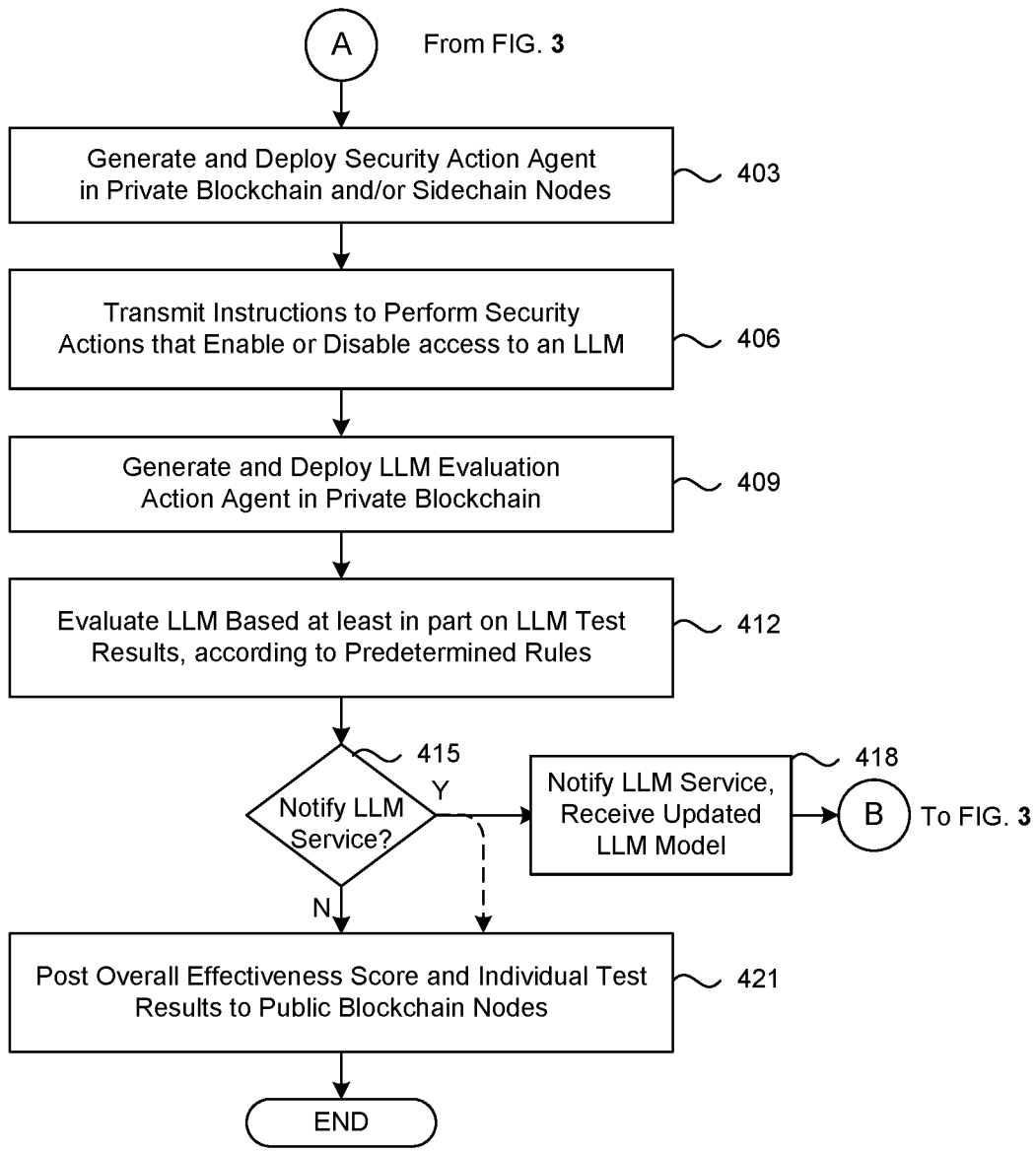
FIG. 4 is a flowchart illustrating functionality performed by components of the networked environment of FIG. 1 for blockchain enabled LLM red teaming, and continuing the flowchart of FIG. 3 according to various embodiments of the present disclosure.

FIG. 4 shows a flowchart that expands on the flowchart of FIG. 3, providing an example of blockchain enabled LLM red teaming implemented using components of the networked environment 100. The flowchart of FIG. 4 provides merely an example of the many different types of functional arrangements that can be employed to implement the depicted interactions between the components of the networked environment 100. As an alternative, the flowchart of FIG. 4 can be viewed as depicting an example of elements of a method implemented within the networked environment 100. While actions are generally described as performed using a particular component, the actions can additionally or alternatively be implemented at least in part using other components of the networked environment 100.

In block 403, the LLM red teaming management agent 120 can generate and deploy the LLM security agent 122d so that it is available privately using the private nodes 206. In some examples, the LLM security agent 122d can be generated to have permissioned access to results of the various analysis actions, so that the LLM security agent 122d can perform certain functions that are identified based at least in part on the results of analysis actions. In other examples, the LLM red teaming management agent 120 can receive results from the subsidiary agents or subprocesses that perform the analysis actions and can deploy the LLM security agent 122d to perform certain functions that are identified based at least in part on the results of analysis actions.

In block 406, the LLM security agent 122d can transmit instructions that cause enterprise or cloud computing environments to perform security operations that enable or disable access to an LLM 170. This can include permitting or denying access to inbound communications from and outbound communications to an LLM 170 and its network LLM service 109. The security operations can include transmitting communications that implement firewall updates, IPS system updates, IDS system updates, SIEM system updates, threat intelligence system updates, and threat hunting updates, among updates.

The LLM security agent 122d can have access to communicate with the components and systems that perform the updates. In some embodiments, the LLM security agent 122d can include, create, and communicate with an LLM security agent 122d that is operated by sidechain nodes 209 within the enterprise or cloud computing environments. Deployment of LLM security agent 122d by sidechain nodes 209 within the enterprise or cloud computing environments can enable access to the various components that perform updates to the enterprise or cloud computing environments without opening additional communication ports for the LLM security agent 122d. To this end, in some embodiments, communications between the LLM security agent 122d and the LLM security agent 122d can be initiated by the LLM security agent 122d.

In block 409, the LLM red teaming management agent 120 can generate and deploy the LLM evaluation agent 122e so that it is available privately using the private nodes 206. This can include transmitting a transaction that includes the LLM evaluation agent 122e and instructions to deploy and execute it using the private nodes 206. The LLM evaluation agent 122e can have access to a public ledger, private ledger, or side ledger generated using the LLM action agents 122, including the LLM red teaming agents 122a. These LLM action agents 122 can store results from the various analysis actions in a public, private, or side ledger so that they are accessible to the LLM evaluation agent 122e.

In block 412, the LLM evaluation agent 122e can evaluate the LLM 170 based at least in part on the results of the analysis actions and according to a set of predetermined LLM evaluation rules. The LLM evaluation agent 122e can include a set of predetermined LLM evaluation rules that it uses to process and weight scores for the various red teaming tests to generate an overall score. The overall score can be compared to a threshold overall score to identify an endorsement status such as a binary decision to support or deny endorsement of the LLM 170. The endorsement status can also include an overall numerical endorsement, an overall symbol-based endorsement, an overall color-coded endorsement, an overall textual description-based endorsement, or any combination thereof. The endorsement status can also include category-specific numerical endorsements, symbol-based endorsements, textual description-based endorsement, or any combination thereof. The category-specific scores can correspond to the various types of LLM red teaming actions 221, as well as the LLM SBOM actions 227, LLM TSSC actions 233, and LLM security actions 239. The LLM evaluation agent 122e can transmit the endorsement status information to the LLM red teaming management agent 120 or another publicly available ledger. In other words, the LLM evaluation agent 122e can transmit a transaction that includes the endorsement status information for public storage and access using the public nodes 203.

In block 415, the LLM evaluation agent 122e or the LLM red teaming management agent 120 can determine whether to notify the network LLM service 109 of the endorsement status information for the LLM 170. For example, if the network LLM service 109 that provides the LLM 170 is registered with the LLM red teaming management service 103 and has requested endorsement status information for the analysis of the LLM 170, then the process can move to block 418. In some examples, the network LLM service 109 can be notified and given an opportunity to correct the LLM 170 prior to publicly posting of the endorsement status information. Otherwise, if the network LLM service 109 is not to be notified, then the process can move to block 421. In some examples where the network LLM service 109 is to be notified, the process can also move to block 421.

In block 418, the LLM evaluation agent 122e or the LLM red teaming management agent 120 can transmit a notification to the network LLM service 109 that includes the endorsement status information for the LLM 170. The notification can also include all or a subset of the results from the LLM analysis actions, and recommendations to correct deficiencies. The LLM evaluation agent 122e or the LLM red teaming management agent 120 can receive an updated LLM 170 or an indication that the LLM 170 is updated. Since the previously generated endorsement status information for the LLM 170 is outdated for the updated version of the LLM 170, the process can move to connector B. Connector B connects to FIG. 3, where the components of the networked environment can perform red teaming of the updated version of the LLM 170.

In block 421, the LLM evaluation agent 122e can post the overall evaluation score and other endorsement status information to the public nodes 203. For example, the LLM evaluation agent 122e can transmit a transaction to a public blockchain that includes the evaluation information. The LLM evaluation agent 122e can additionally or alternatively generate and deploy a separate and publicly available LLM endorsement agent 122 using the public nodes 203. In some examples, the LLM endorsement agent 122 can also include all or a subset of the results generated by the LLM analysis actions performed by the network services 111.

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random-access portion of the memory and run by the processor, source code that can be expressed in proper format such as object code that is capable of being loaded into a random-access portion of the memory and executed by the processor, or source code that can be interpreted by another executable program to generate instructions in a random-access portion of the memory to be executed by the processor. An executable program can be stored in any portion or component of the memory, including random-access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random-access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random-access memory (SRAM), dynamic random-access memory (DRAM), or magnetic random-access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts and sequence diagrams show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the flowcharts and sequence diagrams show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the flowcharts and sequence diagrams can be skipped or omitted. In addition, any number of counters, state variables, warning semaphores, or messages could be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g., storage area networks or distributed or clustered filesystems or databases) can also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random-access memory (RAM) including static random-access memory (SRAM) and dynamic random-access memory (DRAM), or magnetic random-access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or any combination thereof. For example, a plurality of the applications described herein can execute in the same computing device, or in multiple computing devices in the same computing environment.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X; Y; Z; X or Y; X or Z; Y or Z; X, Y, or Z; etc.). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A system, comprising:
   at least one computing device comprising at least one processor and at least one memory; and
   machine-readable instructions stored in the at least one memory that, when executed by the at least one processor, cause the at least one computing device to at least:
   execute, in a distributed ledger environment, a large language model (LLM) red teaming management agent that initiates a security analysis of an LLM by deploying a plurality of subsidiary agents in the distributed ledger environment, wherein the subsidiary agents perform actions for the security analysis of the LLM;
   execute an LLM red teaming agent of the plurality of subsidiary agents, wherein the LLM red teaming agent transmits a request for a network service to perform an LLM red teaming action for the security analysis of the LLM, and the LLM red teaming agent receives an LLM red teaming result of the LLM red teaming action; and
   execute an LLM evaluation agent of the plurality of subsidiary agents, wherein the LLM evaluation agent evaluates the LLM red teaming result to generate endorsement status information for the LLM.

2. The system of claim 1, wherein the LLM red teaming management agent is deployed in public nodes of the distributed ledger environment, and the plurality of subsidiary agents are deployed in private nodes of the distributed ledger environment.

3. The system of claim 1, wherein the LLM red teaming agent generates a graphical user interface or a programmatic interface that receives the LLM red teaming result from the network service.

4. The system of claim 1, wherein the LLM evaluation agent transmits at least a portion of the endorsement status information to the LLM red teaming management agent.

5. The system of claim 1, wherein the plurality of subsidiary agents further comprises at least one of: a software bill of materials (SBOM) agent that generates an SBOM based at least in part on the LLM, a trusted software supply chain (TSSC) agent that identifies a signature based at least in part on the LLM, or any combination thereof.

6. The system of claim 1, wherein the plurality of subsidiary agents further comprises an LLM security agent that transmits instructions that enable or disable communications with the LLM based at least in part on the endorsement status information.

7. The system of claim 1, wherein the LLM evaluation agent transmits a notification comprising at least a portion of the endorsement status information to an LLM network service that provides the LLM.

8. A method, comprising:
   initiating, by a large language model (LLM) red teaming management agent executed in a distributed ledger environment, a security analysis of an LLM by deploying a plurality of subsidiary agents in the distributed ledger environment;
   transmitting, by an LLM red teaming agent deployed by the LLM red teaming management agent, a request for a network service to perform an LLM red teaming action, wherein the LLM red teaming agent receives an LLM red teaming result of the LLM red teaming action from the network service; and evaluating, by an LLM evaluation agent deployed by the LLM red teaming management agent, the LLM red teaming result to generate endorsement status information for the LLM.

9. The method of claim 8, further comprising:
transmitting, by the LLM evaluation agent, at least a portion of the endorsement status information to a publicly available network location.

10. The method of claim 8, wherein the LLM red teaming agent and the LLM evaluation agent are executed using private nodes of the distributed ledger environment.

11. The method of claim 8, further comprising:
transmitting, by an LLM security agent deployed by the LLM red teaming management agent, instructions that enable or disable communications with the LLM.

12. The method of claim 11, wherein the LLM security agent is executed using at least one of: private nodes of the distributed ledger environment, sidechain nodes of the distributed ledger environment, or any combination thereof.

13. The method of claim 8, further comprising:
generating, by the LLM red teaming agent, a graphical user interface or a programmatic interface; and
receiving the LLM red teaming result from the network service based at least in part on the graphical user interface or the programmatic interface.

14. The method of claim 8, wherein the plurality of subsidiary agents comprise at least one of: a software bill of materials (SBOM) agent that generates an SBOM based at least in part on the LLM, a trusted software supply chain (TSSC) agent that identifies a signature based at least in part on the LLM, or any combination thereof.

15. A system, comprising:
at least one computing device comprising at least one processor and at least one memory; and
machine-readable instructions stored in the at least one memory that, when executed by the at least one processor, cause the at least one computing device to at least:
deploy, by a large language model (LLM) red teaming management agent executed in a distributed ledger environment, a plurality of subsidiary agents in the distributed ledger environment;
transmit, by an LLM red teaming agent deployed by the LLM red teaming management agent, a notification for a network service to perform an LLM red teaming action and return, to the LLM red teaming agent, an LLM red teaming result of the LLM red teaming action; and
evaluate, by an LLM evaluation agent deployed by the LLM red teaming management agent, the LLM red teaming result to generate endorsement status information for the LLM.

16. The system of claim 15, wherein the LLM red teaming action comprises at least one of: a red-teaming-based harmful content mitigation test of the LLM, a red-teaming-based bias mitigation test of the LLM, a red-teaming-based sensitive data element (SDE) leakage prevention test of the LLM, a red-teaming-based hallucination mitigation test of the LLM, a red-teaming-based LLM threat model test of the LLM, a red-teaming-based prompt injection security test of the LLM, or any combination thereof.

17. The system of claim 15, wherein the LLM red teaming result comprises at least one of: a score generated by the LLM red teaming action, a document generated by the LLM red teaming action, a suggested corrective action generated by the LLM red teaming action, an example of an inappropriate interaction identified by the LLM red teaming action, an example of an inappropriate LLM response identified by the LLM red teaming action, or any combination thereof.

18. The system of claim 15, wherein the machine-readable instructions, when executed by the at least one processor, further cause the at least one computing device to at least:
transmit, by an LLM security agent deployed by the LLM red teaming management agent, instructions that enable or disable communications with the LLM.

19. The system of claim 18, wherein the LLM security agent is executed using at least one of: private nodes of the distributed ledger environment, sidechain nodes of the distributed ledger environment, or any combination thereof.

20. The system of claim 15, wherein the machine-readable instructions, when executed by the at least one processor, further cause the at least one computing device to at least:
transmit, by the LLM evaluation agent, at least a portion of the endorsement status information to a publicly available network location.

\* \* \* \* \*